United States Patent
Kwon et al.

(10) Patent No.: US 10,006,521 B2
(45) Date of Patent: Jun. 26, 2018

(54) PLANETARY GEAR TRAIN OF AUTOMATIC TRANSMISSION FOR A VEHICLE

(71) Applicant: Hyundai Motor Company, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 106 days.

(21) Appl. No.: 15/366,761

(22) Filed: Dec. 1, 2016

(65) Prior Publication Data
US 2018/0073603 A1 Mar. 15, 2018

(30) Foreign Application Priority Data
Sep. 12, 2016 (KR) .................. 10-2016-0117356

(51) Int. Cl.
*F16H 3/66* (2006.01)
(52) U.S. Cl.
CPC ........ *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS 9,222,553 B2 * 12/2015 Beck .................. F16H 3/666
9,618,095 B2 *  4/2017 Beck .................. F16H 3/666
9,816,589 B2 * 11/2017 Cho .................... F16H 3/66

FOREIGN PATENT DOCUMENTS

KR    10-2016-0049573    5/2016

\* cited by examiner

*Primary Examiner* — Dirk Wright
(74) *Attorney, Agent, or Firm* — Brinks Gilson & Lione

(57) ABSTRACT

The present disclosure provides a planetary gear train of an automatic transmission for a vehicle. The planetary gear train may include: an input shaft receiving torque from an engine; an output shaft outputting changed torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; a fourth planetary gear set including a tenth rotation element, an eleventh rotation element, and a twelfth rotation element. The planetary gear train may improve power delivery performance and reduce fuel consumption by providing ten forward speeds utilizing reduced components and also improve silent driving.

10 Claims, 2 Drawing Sheets

FIG. 2

| Speed stage | C1 | C2 | C3 | C4 | C5 | B1 | Gear ratio |
|---|---|---|---|---|---|---|---|
| D1 | ● | | | ● | | ● | 5.405 |
| D2 | | ● | | ● | | ● | 3.200 |
| D3 | | ● | | | ● | ● | 2.200 |
| D4 | ● | ● | | | | ● | 1.625 |
| D5 | ● | ● | | | ● | | 1.220 |
| D6 | ● | ● | ● | | | | 1.000 |
| D7 | | ● | ● | | ● | | 0.876 |
| D8 | ● | | ● | | ● | | 0.786 |
| D9 | | | ● | ● | ● | | 0.688 |
| D10 | ● | | | ● | ● | | 0.524 |
| REV | ● | | ● | | | ● | -2.275 |

PLANETARY GEAR TRAIN OF AUTOMATIC TRANSMISSION FOR A VEHICLE

CROSS-REFERENCE TO RELATED APPLICATION

This application claims priority to and the benefit of Korean Patent Application No. 10-2016-0117356, filed on Sep. 12, 2016, the entire contents of which are incorporated herein by reference.

FIELD

The present disclosure relates to a planetary gear train of an automatic transmission for a vehicle. More particularly, the present disclosure relates to a planetary gear train of an automatic transmission for a vehicle.

BACKGROUND

The statements in this section merely provide background information related to the present disclosure and may not constitute prior art.

Recently, increasing oil prices have caused vehicle manufactures all over the world to rush into infinite competition. Particularly in the case of engines, manufactures have been pursuing efforts to reduce the weight and improve fuel efficiency of vehicles by reducing engine size, etc.

As a result, research into reduction of weight and enhancement of fuel efficiency through downsizing has been conducted for an engine, and research for simultaneously securing operability and fuel efficiency competitiveness through multiple speed stages has been conducted for an automatic transmission.

However, in the automatic transmission, as the number of speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components is important in order to increase a fuel efficiency enhancement effect through the multiple speed stages.

In this aspect, in recent years, 8-speed automatic transmission tends to be implemented, and the research and development of a planetary gear train capable of implementing more speed stages has also been actively conducted.

A conventional automatic transmission of eight or more speed stages typically includes three or four planetary gear sets and five or seven control elements (frictional elements), and thus mountability may be deteriorated due to increase of volume and weight.

In this regard, disposing planetary gear sets in parallel or employing dog clutches instead of wet-type control elements has been attempted. However, such an arrangement is not widely applicable, and using the dog clutches may deteriorate shift-feel.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle that improves power delivery performance and fuel efficiency by achieving ten forward speed stages and one reverse speed stage using a reduced number of constituent elements, and improves silent driving by using a driving point positioned at a low engine speed.

In various aspects of the present disclosure, a planetary gear train of an automatic transmission for a vehicle may include: an input shaft configured to receive torque from an engine; an output shaft configured to output changed torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; a fourth planetary gear set including a tenth rotation element, an eleventh rotation element, and a twelfth rotation element; a first shaft connected to the first rotation element and the twelfth rotation element; a second shaft connected to the second rotation element, the eleventh rotation element, and the output shaft; a third shaft connected to the third rotation element and the sixth rotation element; a fourth shaft connected to the fourth rotation element; a fifth shaft connected to the fifth rotation element and configured to be selectively connected to the first shaft; a sixth shaft connected to the seventh rotation element and a transmission housing; a seventh shaft connected to the eighth rotation element and the input shaft, and configured to be selectively connected to the fourth shaft and the fifth shaft; a eighth shaft connected to the ninth rotation element; and a ninth shaft connected to the tenth rotation element and configured to be selectively connected to the fifth shaft and the eighth shaft.

The first shaft may be selectively connected to the transmission housing.

The first rotation element, the second rotation element, and the third rotation element of the first planetary gear set may be a first sun gear, a first planet carrier, and a first ring gear, and the fourth rotation element, the fifth rotation element, and the sixth rotation element of the second planetary gear set may be a second sun gear, a second planet carrier, and a second ring gear, respectively. The seventh rotation element, the eighth rotation element, and the ninth rotation element of the third planetary gear set may be a third sun gear, a third planet carrier, and a third ring gear, and the tenth rotation element, the eleventh rotation element, and the twelfth rotation element of the fourth planetary gear set may be a fourth sun gear, a fourth planet carrier, and a fourth ring gear, respectively.

The first, second, third, and fourth planetary gear sets may be disposed in a sequence of the first, second, third, and fourth planetary gear sets from an engine side.

The planetary gear train may further include: a first clutch configured to selectively connect the fourth shaft to the seventh shaft; a second clutch configured to selectively connect the fifth shaft to the seventh shaft; a third clutch configured to selectively connect the first shaft to the fifth shaft; a fourth clutch configured to selectively connect the fifth shaft to the ninth shaft; a fifth clutch configured to selectively connect the eighth shaft to the ninth shaft; and a first brake configured to selectively connect the first shaft to the transmission housing.

In various forms of the present disclosure, a planetary gear train of an automatic transmission for a vehicle may include: an input shaft configured to receive torque from an engine; an output shaft configured to output changed torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; and a fourth planetary gear set including a tenth rotation element, an eleventh rotation element, and a twelfth rotation element, in which the input shaft may be connected to the eighth rotation element, the output shaft may be connected to the eleventh rotation element, the first rotation element may be connected to the twelfth rotation element, the second rotation element may be connected to the eleventh rotation element, the third rotation element may be connected to the sixth rotation element, the fourth rotation element may be selectively connected to the eighth rotation element, the fifth rotation element may be selectively connected to the first rotation element, the eighth rotation element, and the tenth rotation element, the ninth rotation element may be selectively connected to the tenth rotation element, and the seventh rotation element may be connected to a transmission housing.

The first rotation element may be selectively connected to the transmission housing.

The first rotation element, the second rotation element, and the third rotation element of the first planetary gear set may be a first sun gear, a first planet carrier, and a first ring gear, and the fourth rotation element, the fifth rotation element, and the sixth rotation element of the second planetary gear set may be a second sun gear, a second planet carrier, and a second ring gear, respectively. The seventh rotation element, the eighth rotation element, and the ninth rotation element of the third planetary gear set may be a third sun gear, a third planet carrier, and a third ring gear, and the tenth rotation element, the eleventh rotation element, and the twelfth rotation element of the fourth planetary gear set may be a fourth sun gear, a fourth planet carrier, and a fourth ring gear.

The first, second, third, and fourth planetary gear sets may be disposed in a sequence of the first, second, third, and fourth planetary gear sets from an engine side.

The planetary gear train may further include: a first clutch configured to selectively connect the fourth rotation element to the eighth rotation element; a second clutch configured to selectively connect the fifth rotation element to the eighth rotation element; a third clutch configured to selectively connect the first rotation element to the fifth rotation element; a fourth clutch configured to selectively connect the fifth rotation element to the tenth rotation element; a fifth clutch configured to selectively connect the ninth rotation element to the tenth rotation element; and a first brake configured to selectively connect the first rotation element to the transmission housing.

Various forms of the present disclosure may achieve ten forward speed stages and one reversed speed stage by combining four planetary gear sets with six control elements.

Since a speed stage suitable to an engine speed may be achieved due to multiple speed stages and a driving point positioned at a low engine speed may be used, silent driving may be improved.

In addition, engine driving efficiency may be increased by achieving multiple speed stages, and power delivery performance and fuel efficiency may be improved.

Further, the effects which may be obtained or predicted by the exemplary forms of the present disclosure will be directly or implicitly disclosed in the detailed description of the present disclosure. That is, various effects which are predicted by the exemplary form of the present disclosure will be described in the detailed description to be described below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of control elements at each speed stage in the planetary gear train.

Figure 1:
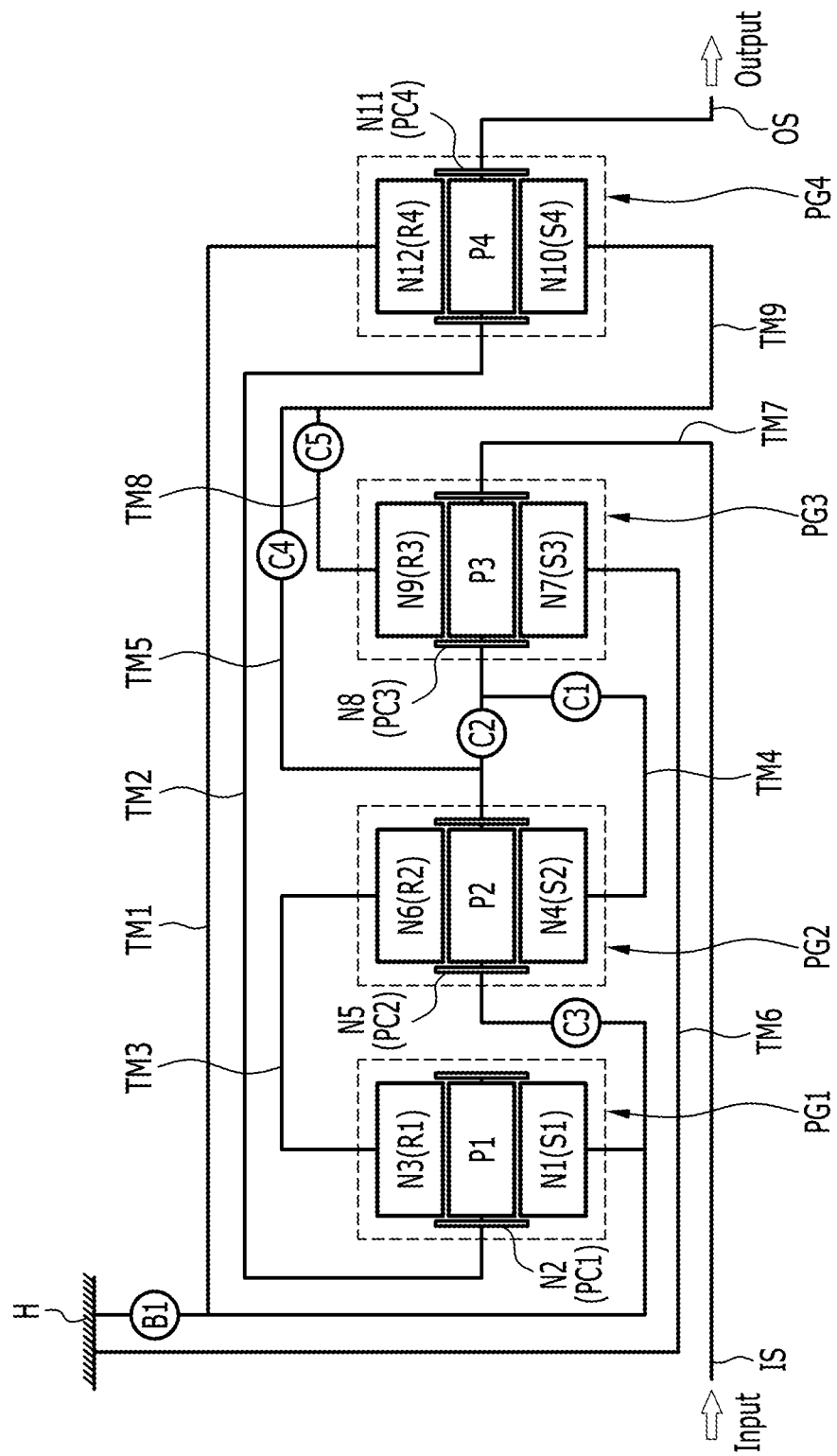
FIG. 1 is a schematic diagram of a planetary gear train.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an exemplary form of the present disclosure will be described in detail with reference to accompanying drawings.

However, parts which are not related with the description are omitted for clearly describing the exemplary form of the present disclosure and like reference numerals refer to like or similar elements throughout the present disclosure.

In the following description, dividing names of components into first, second, and the like is to divide the names because the names of the components are the same as each other and an order thereof is not particularly limited.

FIG. 1 is a schematic diagram of a planetary gear train in one of various forms of the present disclosure.

Referring to FIG. 1, a planetary gear train includes: first, second, third, and fourth planetary gear sets "PG1", "PG2", "PG3", and "PG4" disposed on the same axis; an input shaft "IS"; an output shaft "OS"; nine shaft "TM1" to "TM9" connected to at least one of rotation elements of the first, second, third, and fourth planetary gear sets PG1 PG2, PG3, and PG4; five control elements "C1" to "C5" and "B1"; and a transmission housing "H".

Torque of an engine input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed in a sequence of the first, second, third, and fourth planetary gear sets PG1, PG2, PG3, and PG4 from an engine side.

The input shaft IS is an input member and power from a crankshaft of the engine is torque-converted through a torque converter to be input to the input shaft IS.

The output shaft OS is an output member, is disposed in parallel with the input shaft IS, and transmit driving torque to a driving wheel through a differential apparatus.

The first planetary gear set PG1 is a single pinion planetary gear set and includes: a first sun gear "S1", a first planet carrier "PC1" rotatably supporting a first plurality of pinion gears "P1" externally meshed with the first sun gear S1, and a first ring gear "R1" internally meshed with the first plurality of pinion gears P1 respectively as first, second, and third rotation elements "N1", "N2", and "N3".

The second planetary gear set PG2 is a single pinion planetary gear set and includes: a second sun gear "S2" a second planet carrier "PC2" rotatably supporting a second plurality of pinion gears "P2" externally meshed with the second sun gear S2, and a second ring gear "R2" internally meshed with the second plurality of pinion gears P2 respectively as fourth, fifth, and sixth rotation elements "N4", "N5", and "N6".

The third planetary gear set PG3 is a single pinion planetary gear set and includes: a third sun gear "S3", a third planet carrier "PC3" rotatably supporting a third plurality of pinion gears "P3" externally meshed with the third sun gear S3, and a third ring gear "R3" internally meshed with the third plurality of pinion gears P3 respectively as seventh, eighth, and ninth rotation elements "N7", "N8", and "N9".

The fourth planetary gear set PG4 is a single pinion planetary gear set and includes: a fourth sun gear "S4", a fourth planet carrier "PC4" rotatably supporting a fourth plurality of pinion gears "P4" externally meshed with the fourth sun gear S4, and a fourth ring gear "R4" internally meshed with the fourth plurality of pinion gears P4 respectively as tenth, eleventh, and twelfth rotation elements "N10" "N11", and "N12".

The first rotation element N1 is directly connected to the twelfth rotation element N12, the second rotation element N2 is directly connected to the eleventh rotation element N11, the third rotation element N3 is directly connected to the sixth rotation element N6, and the first, second, third, and fourth planetary gear sets PG1, PG2, PG3, and PG4 are operated with nine shafts TM1 to TM9.

The nine shafts TM1 to TM9 will be described in further detail.

Each of nine shafts TM1 to TM9 may directly connect at least one rotation element to another rotation element, may be a rotational element member rotating with at least one rotation element, may be a rotational element selectively connecting at least one rotation element to the transmission housing H, or may be a fixed member fixed to the transmission housing H.

The first shaft TM1 is directly connected to the first sun gear S1 and the fourth ring gear R4 and is selectively connected to the transmission housing H to be operated as a selective fixed element.

The second shaft TM2 is directly connected to the first planet carrier PC1 and the fourth planet carrier PC4 and is directly or indirectly connected to the output shaft OS to be continuously operated as an output element.

The third shaft TM3 is directly connected to the first ring gear R1 and the second ring gear R2.

The fourth shaft TM4 is directly connected to the second sun gear S2.

The fifth shaft TM5 is directly connected to the second planet carrier PC2 and is selectively connected to the first shaft TM1.

The sixth shaft TM6 is directly connected to the third sun gear S3 and is directly connected to the transmission housing H to be continuously operated as a fixed element.

The seventh shaft TM7 is directly connected to the third planet carrier PC3, is directly connected to the input shaft IS to be continuously operated as an input element, is selectively connected to the fourth shaft TM4, and is selectively connected to the fifth shaft TM5.

The eighth shaft TM8 is directly connected to the third ring gear R3.

The ninth shaft TM9 is directly connected to the fourth sun gear S4, is selectively connected to the fifth shaft TM5, and is selectively connected to the eighth shaft TM8.

In addition, five clutches C1, C2, C3, C4, and C5 which are control elements are disposed at connection portions between any two shafts among the shafts TM1 to TM9.

In addition, one brake B1 which is a control element is disposed at a connection portion between any one shaft among the shafts TM1 to TM9 and the transmission housing H.

The five clutches C1 to C5 and the one brake B1 will be described in further detail.

The first clutch C1 is disposed between the fourth shaft TM4 and the seventh shaft TM7 and selectively causes the fourth shaft TM4 and the seventh shaft TM7 to integrally rotate with each other.

The second clutch C2 is disposed between the fifth shaft TM5 and the seventh shaft TM7 and selectively causes the fifth shaft TM5 and the seventh shaft TM7 to integrally rotate each other.

The third clutch C3 is disposed between the first shaft TM1 and the fifth shaft TM5 and selectively causes the first shaft TM1 and the fifth shaft TM5 to integrally rotate each other.

The fourth clutch C4 is disposed between the fifth shaft TM5 and the ninth shaft TM9 and selectively causes the fifth shaft TM5 and the ninth shaft TM9 to integrally rotate each other.

The fifth clutch C5 is disposed between the eighth shaft TM8 and the ninth shaft TM9 and selectively causes the eighth shaft TM8 and the ninth shaft TM9 to integrally rotate each other.

The first brake B1 is disposed between the first shaft TM1 and the transmission housing H and causes the first shaft TM1 to be operated as a selective fixed element.

The control elements including the first, second, third, fourth, and fifth clutches C1, C2, C3, C4, and C5 and the first brake B1 may be multi-plates friction elements of wet type that are operated by hydraulic pressure, or may be friction elements such as dog clutches, electronic clutches, and magnetic clutches that are operated by electrical signals.

FIG. 2 is an operation chart of control elements at each speed stage in the planetary gear train in one form of the present disclosure.

Referring to FIG. 2, three control elements are operated at each speed stage in the planetary gear train. Shifting processes in the various forms of the present disclosure will be described in further detail.

The first and fourth clutches C1 and C4 and the first brake B1 are operated at a first forward speed stage D1.

In a state that the fourth shaft TM4 is connected to the seventh shaft TM7 by operation of the first clutch C1 and the fifth shaft TM5 is connected to the ninth shaft TM9 by operation of the fourth clutch C4, torque of the input shaft IS is input to the seventh shaft TM7.

In addition, in a state that the sixth shaft TM6 is continuously operated as the fixed element, the first shaft TM1 is operated as the fixed element by operation of the first brake B1. Therefore, the first forward speed D1 is achieved by cooperation of the shafts and changed torque is output through the output shaft OS connected to the second shaft TM2.

The second and fourth clutches C2 and C4 and the first brake B1 are operated at a second forward speed stage D2.

In a state that the fifth shaft TM5 is connected to the seventh shaft TM7 by operation of the second clutch C2 and the fifth shaft TM5 is connected to the ninth shaft TM9 by operation of the fourth clutch C4, torque of the input shaft IS is input to the seventh shaft TM7.

In addition, in a state that the sixth shaft TM6 is continuously operated as the fixed element, the first shaft TM1 is operated as the fixed element by operation of the first brake B1. Therefore, the second forward speed stage is achieved by cooperation of the shafts and changed torque is output through the output shaft OS connected to the second shaft TM2.

The second and fifth clutches C2 and C5 and the first brake B1 are operated at a third forward speed stage D3.

In a state that the fifth shaft TM5 is connected to the seventh shaft TM7 by operation of the second clutch C2 and the eighth shaft TM8 is connected to the ninth shaft TM9 by operation of the fifth clutch C5, torque of the input shaft IS is input to the seventh shaft TM7.

In addition, the sixth shaft TM6 is continuously operated as the fixed element, the first shaft TM1 is operated as the fixed element by operation of the first brake B1. Therefore, the third forward speed stage D3 is achieved by cooperation of the shafts and changed torque is output through the output shaft OS connected to the second shaft TM2.

The first and second clutches C1 and C2 and the first brake B1 are operated at a fourth forward speed stage D4.

In a state that the fourth shaft TM4 is connected to the seventh shaft TM7 by operation of the first clutch C1 and the fifth shaft TM5 is connected to the seventh shaft TM7 by operation of the second clutch C2, torque of the input shaft IS is input to the seventh shaft TM7.

In addition, the sixth shaft TM6 is continuously operated as the fixed element, the first shaft TM1 is operated as the fixed element by operation of the first brake B1. Therefore, the fourth forward speed stage D4 is achieved by cooperation of the shafts and changed torque is output through the output shaft OS connected to the second shaft TM2.

The first, second, and fifth clutches C1, C2, and C5 are operated at a fifth forward speed stage D5.

In a state that the fourth shaft TM4 is connected to the seventh shaft TM7 by operation of the first clutch C1, the fifth shaft TM5 is connected to the seventh shaft TM7 by operation of the second clutch C2, and the eighth shaft TM8 is connected to the ninth shaft TM9 by operation of the fifth clutch C5, torque of the input shaft IS is input to the seventh shaft TM7.

In addition, the sixth shaft TM6 is continuously operated as the fixed element. Therefore, the fifth forward speed stage D5 is achieved by cooperation of the shafts and changed torque is output through the output shaft OS connected to the second shaft TM2.

The first, second, and third clutches C1, C2, and C3 are operated at a sixth forward speed stage D6.

In a state that the fourth shaft TM4 is connected to the seventh shaft TM7 by operation of the first clutch C1, the fifth shaft TM5 is connected to the seventh shaft TM7 by operation of the second clutch C2, and the first shaft TM1 is connected to the fifth shaft TM5 by operation of the third clutch C3, torque of the input shaft IS is input to the seventh shaft TM7.

In this case, the first, second, and fourth planetary gear sets PG1, PG2, and PG4 integrally rotate and the sixth shaft TM6 is operated as the fixed element. Therefore, the sixth forward speed stage D6 is achieved. At the sixth forward speed stage D6, rotation speed that is the same as that of the input shaft IS is output.

The second, third, and fifth clutches C2, C3, and C5 are operated at a seventh forward speed stage D7.

In a state that the fifth shaft TM5 is connected to the seventh shaft TM7 by operation of the second clutch C2, the first shaft TM1 is connected to the fifth shaft TM5 by operation of the third clutch C3, and the eighth shaft TM8 is connected to the ninth shaft TM9 by operation of the fifth clutch C5, torque of the input shaft IS is input to the seventh shaft TM7.

In addition, the sixth shaft TM6 is continuously operated as the fixed element. Therefore, the seventh forward speed stage D7 is achieved by cooperation of the shafts and changed torque is output through the output shaft OS connected to the second shaft TM2.

The first, third, and fifth clutches C1, C3, and C5 are operated at an eighth forward speed stage D8.

In a state that the fourth shaft TM4 is connected to the seventh shaft TM7 by operation of the first clutch C1, the first shaft TM1 is connected to the fifth shaft TM5 by operation of the third clutch C3, and the eighth shaft TM8 is connected to the ninth shaft TM9 by operation of the fifth clutch C5, torque of the input shaft IS is input to the seventh shaft TM7.

In addition, the sixth shaft TM6 is continuously operated as the fixed element. Therefore, the eighth forward speed stage D8 is achieved by cooperation of the shafts and changed torque is output through the output shaft OS connected to the second shaft TM2.

The third, fourth, fifth clutches C3, C4, and C5 are operated at a ninth forward speed stage D9.

In a state that the first shaft TM1 is connected to the fifth shaft TM5 by operation of the third clutch C3, the fifth shaft TM5 is connected to the ninth shaft TM9 by operation of the fourth clutch C4, and the eighth shaft TM8 is connected to the ninth shaft TM9 by operation of the fifth clutch C5, torque of the input shaft IS is input to the seventh shaft TM7.

In addition, the sixth shaft TM6 is continuously operated as the fixed element. Therefore, the ninth forward speed stage D9 is achieved by cooperation of the shafts and changed torque is output through the output shaft OS connected to the second shaft TM2.

The first, fourth, and fifth clutches C1, C4, and C5 are operated at a tenth forward speed stage D10.

In a state that the fourth shaft TM4 is connected to the seventh shaft TM7 by operation of the first clutch C1, the fifth shaft TM5 is connected to the ninth shaft TM9 by operation of the fourth clutch C4, and the eighth shaft TM8 is connected to the ninth shaft TM9 by operation of the fifth clutch C5, torque of the input shaft IS is input to the seventh shaft TM7.

In addition, the sixth shaft TM6 is continuously operated as the fixed element. Therefore, the tenth forward speed stage D10 is achieved by cooperation of the shafts and changed torque is output through the output shaft OS connected to the second shaft TM2.

The first and third clutches C1 and C3 and the first brake B1 are operated at a reverse speed stage REV.

In a state that the fourth shaft TM4 is connected to the seventh shaft TM7 by operation of the first clutch C1 and the first shaft TM1 is connected to the fifth shaft TM5 by operation of the third clutch C3, torque of the input shaft IS is input to the seventh shaft TM7.

In addition, the sixth shaft TM6 is continuously operated as the fixed element, the first shaft TM1 is operated as the fixed element by operation of the first brake B1. Therefore, the reverse speed stage REV is achieved by cooperation of the shafts and changed torque is output through the output shaft OS connected to the second shaft TM2.

The planetary gear train in various forms of the present disclosure may achieve ten forward speed stages and one reverse speed stage by control of the four planetary gear sets PG1, PG2, PG3, and PG4, five clutches C1, C2, C3, C4, and C5, and one brake B1.

Since a speed stage suitable to an engine speed may be achieved due to multiple speed stages and a driving point positioned at a low engine speed may be used, silent driving may be improved.

In addition, engine driving efficiency may be increased by achieving multiple speed stages, and power delivery performance and fuel efficiency may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1: first brake
C1, C2, C3, C4, C5: first, second, third, fourth, and fifth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8, TM9: first, second, third, fourth, fifth, sixth, seventh, eighth, and ninth shafts

What is claimed is:

1. A planetary gear train of an automatic transmission for a vehicle, comprising:
an input shaft configured to receive torque from an engine;
an output shaft configured to output changed torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
a first shaft connected to the first rotation element and the twelfth rotation element;
a second shaft connected to the second rotation element, the eleventh rotation element, and the output shaft;
a third shaft connected to the third rotation element and the sixth rotation element;
a fourth shaft connected to the fourth rotation element;
a fifth shaft connected to the fifth rotation element and configured to be selectively connected to the first shaft;
a sixth shaft connected to the seventh rotation element and a transmission housing;
a seventh shaft connected to the eighth rotation element and the input shaft, and configured to be selectively connected to the fourth shaft and the fifth shaft;
a eighth shaft connected to the ninth rotation element; and
a ninth shaft connected to the tenth rotation element and configured to be selectively connected to the fifth shaft and the eighth shaft.

2. The planetary gear train of claim 1, wherein the first shaft is configured to be selectively connected to the transmission housing.

3. The planetary gear train of claim 1, wherein the first rotation element, the second rotation element, and the third rotation element of the first planetary gear set are a first sun gear, a first planet carrier, and a first ring gear,
the fourth rotation element, the fifth rotation element, and the sixth rotation element of the second planetary gear set are a second sun gear, a second planet carrier, and a second ring gear,
the seventh rotation element, the eighth rotation element, and the ninth rotation element of the third planetary gear set are a third sun gear, a third planet carrier, and a third ring gear, and
the tenth rotation element, the eleventh rotation element, and the twelfth rotation element of the fourth planetary gear set are a fourth sun gear, a fourth planet carrier, and a fourth ring gear.

4. The planetary gear train of claim 1, wherein the first, second, third, and fourth planetary gear sets are disposed in a sequence of the first, second, third, and fourth planetary gear sets from an engine side.

5. The planetary gear train of claim 2, further comprising:
a first clutch configured to selectively connect the fourth shaft to the seventh shaft;
a second clutch configured to selectively connect the fifth shaft to the seventh shaft;
a third clutch configured to selectively connect the first shaft to the fifth shaft;
a fourth clutch configured to selectively connect the fifth shaft to the ninth shaft;
a fifth clutch configured to selectively connect the eighth shaft to the ninth shaft; and
a first brake configured to selectively connect the first shaft to the transmission housing.

6. A planetary gear train of an automatic transmission for a vehicle, comprising:
an input shaft configured to receive torque from an engine;
an output shaft configured to output changed torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element; and
a fourth planetary gear set including a tenth rotation element, an eleventh rotation element, and a twelfth rotation element,
wherein the input shaft is connected to the eighth rotation element,
the output shaft is connected to the eleventh rotation element,
the first rotation element is connected to the twelfth rotation element,
the second rotation element is connected to the eleventh rotation element, the third rotation element is connected to the sixth rotation element, the fourth rotation element is configured to be selectively connected to the eighth rotation element, the fifth rotation element is configured to be selectively connected to the first rotation element, the eighth rotation element, and the tenth rotation element, the ninth rotation element is configured to be selectively connected to the tenth rotation element, and the seventh rotation element is connected to a transmission housing.

7. The planetary gear train of claim 6, wherein the first rotation element is configured to be selectively connected to the transmission housing.

8. The planetary gear train of claim 6, wherein the first rotation element, the second rotation element, and the third rotation element of the first planetary gear set are a first sun gear, a first planet carrier, and a first ring gear, the fourth rotation element, the fifth rotation element, and the sixth rotation element of the second planetary gear set are a second sun gear, a second planet carrier, and a second ring gear, the seventh rotation element, the eighth rotation element, and the ninth rotation element of the third planetary gear set are a third sun gear, a third planet carrier, and a third ring gear, and the tenth rotation element, the eleventh rotation element, and the twelfth rotation element of the fourth planetary gear set are a fourth sun gear, a fourth planet carrier, and a fourth ring gear.

9. The planetary gear train of claim 6, wherein the first, second, third, and fourth planetary gear sets are disposed in a sequence of the first, second, third, and fourth planetary gear sets from an engine side.

10. The planetary gear train of claim 7, further comprising:

a first clutch configured to selectively connect the fourth rotation element to the eighth rotation element;

a second clutch configured to selectively connect the fifth rotation element to the eighth rotation element;

a third clutch configured to selectively connect the first rotation element to the fifth rotation element;

a fourth clutch configured to selectively connect the fifth rotation element to the tenth rotation element;

a fifth clutch configured to selectively connect the ninth rotation element to the tenth rotation element; and a first brake configured to selectively connect the first rotation element to the transmission housing.

* * * * *